United States Patent [19]

Ishikawa

[11] Patent Number: 5,687,620
[45] Date of Patent: Nov. 18, 1997

[54] FLEXIBLE MESHING TYPE GEAR DEVICE WITH A PASSING TOOTH PROFILE

[75] Inventor: Shoichi Ishikawa, Kanagawa-ken, Japan

[73] Assignee: Harmonic Drive Systems, Inc., Tokyo, Japan

[21] Appl. No.: 564,209

[22] PCT Filed: Apr. 14, 1995

[86] PCT No.: PCT/JP95/00738

§ 371 Date: Feb. 15, 1996

§ 102(e) Date: Feb. 15, 1996

[87] PCT Pub. No.: WO95/28583

PCT Pub. Date: Oct. 26, 1995

[30] Foreign Application Priority Data

Apr. 19, 1994 [JP] Japan .................. 6-104441

[51] Int. Cl.$^6$ .................. F16H 37/04; F16H 55/08
[52] U.S. Cl. .................. 74/640; 74/462
[58] Field of Search .................. 74/640, 461, 462

[56] References Cited

U.S. PATENT DOCUMENTS

| | | | |
|---|---|---|---|
| 2,906,143 | 9/1959 | Musser | 74/640 |
| 4,601,216 | 7/1986 | Inoue et al. | 74/640 |
| 4,823,638 | 4/1989 | Ishikawa | 74/462 |
| 4,974,470 | 12/1990 | Ishikawa et al. | 74/640 |
| 5,269,202 | 12/1993 | Kiyosawa et al. | 74/640 |
| 5,388,483 | 2/1995 | Ishida et al. | 74/640 |
| 5,485,766 | 1/1996 | Ishikawa | 74/640 |

FOREIGN PATENT DOCUMENTS

| | | |
|---|---|---|
| 45-41171 | 12/1970 | Japan . |
| 63-115943 | 5/1988 | Japan . |
| 5-172195 | 7/1993 | Japan . |
| 5-172196 | 7/1993 | Japan . |

*Primary Examiner*—Charles A. Marmor
*Assistant Examiner*—Sherry Lynn Estremsky
*Attorney, Agent, or Firm*—Vurns, Doane, Swecker & Mathis LLP

[57] ABSTRACT

In a meshing type gear device (1), spur gears are used for both a rigid internal gear (2) and a flexible external gear (3), and the number of teeth of the flexible gear (3) is made greater by two than that of the rigid internal gear (2). The tooth profile of the flexible external gear (3) is made convex and the shape thereof is that of a curve AC obtained by subjecting a gear tooth portion (curve portion between A and B), which, at the moving path L that the external gear describes relative to the internal gear, as determined by rack approximation, is convex relative to the internal gear, to similarity transformation at a reduction ratio λ using the limiting point A of the contact between the two gears on the path as the origin, while the tooth profile of the rigid internal gear is made concave and the shape thereof is that of a curve AD obtained by subjecting the same portion convex relative to the internal gear at the moving path to similarity transformation at an enlargement ratio (1+λ) using the limiting point A as the origin, whereby the meshing of the two gears maintains continuous contact and is of the passing type.

3 Claims, 7 Drawing Sheets

FLEXIBLE MESHING TYPE GEAR DEVICE WITH A PASSING TOOTH PROFILE

TECHNICAL FIELD

This invention relates to a flexible meshing type gear device. More particularly, this invention relates to the tooth profiles of a rigid internal gear and a flexible external gear used in a flexible meshing type gear device.

BACKGROUND ART

A flexible meshing type gear device typically consists of a rigid circular internal gear, a flexible external gear which has, for example, 2 n (n being a positive integer) fewer teeth than the internal gear and which is disposed inside the internal gear and flexed into an elliptical shape so as to mesh with the internal gear at two places, and a wave generator fitted inside the external gear for flexing it into an elliptical shape.

Although the basic tooth profile for the gears of a flexible meshing type gear device is linear (see U.S. Pat. No. 2,906,143), flexible meshing type gear devices using involute gears have also been developed (see JP-B 45-41171). In addition, for increasing device load capacity the present inventor proposed a system using as the tooth face profile of both gears the curve obtained by similarity transforming the moving path, at a reduction ratio of ½, over a prescribed range from the meshing limit point on the path based on the rack approximation of the tooth of the external gear relative to the internal gear (JP-A 63-115943). This is a system for obtaining continuous contact between the tooth profiles of the tooth faces of both gears.

There is known a flexible meshing type gear device of a type fitted with a cup-shaped flexible external gear. In this type of device, a three-dimensional phenomenon called coning occurs in which the insertion of the elliptical wave generator causes the amount of flexing (difference between the major and minor axes of the ellipse) to gradually increase from the diaphragm side toward the opening portion of the cup-shaped flexible external gear approximately in proportion to the distance from the diaphragm. The tooth profiles described in the aforementioned publications do not take this coning into consideration, however. Therefore, while continuous meshing of the tooth profiles of the two gears can be realized for tooth traces with specific sections (e.g., a non-deviated section corresponding to the normal amount of flexing), tooth interference and other problems arise for other sections of the tooth trace.

The inventor later proposed a flexible meshing type gear device enabling a wider mesh range, without interference, over the entire tooth trace of the cup-shaped flexible external gear. This device is proposed, for example, in Japanese Patent Applications Hei 3-357036 and Hei 3-357037.

The performance being demanded of flexible meshing type gear devices is becoming increasingly sophisticated. To respond to this demand, it is necessary to further improve device strength and wear resistance. There is a particular need to improve the wear resistance of the tooth surface to the maximum possible.

All of the aforementioned inventions enable continuous meshing along the tooth trace. However, the meshing is so-called countermovement meshing. Since it is therefore impossible to avoid disadvantages from the point of maintaining a lubricating oil film between the tooth surfaces, a certain limit on the permissible delivered torque is present owing to tooth surface wear caused by oil film rupture. Because of this, a strong need is felt for an improvement in this respect.

DISCLOSURE OF THE INVENTION

For achieving the aforesaid improvement, this invention undertakes to change the both convex tooth profiles performing countermovement meshing to convex and concave tooth profiles performing pass meshing, proposes a tooth-number reversal method described later, and derives the tooth profile from a moving path with reverse phase.

More specifically, this invention is characterized in that the following configuration is adopted in a flexible meshing type gear device having a rigid internal gear, a flexible external gear inside the internal gear and a wave generator for flexing the external gear into an elliptical cross-sectional shape, causing the external gear to mesh partially with the rigid internal gear and rotating the mesh position of the two gears in the circumferential direction, the rotation of the wave generator producing relative rotation between the two gears.

(a) The rigid internal gear and the flexible external gear are both spur gears.

(b) The number of teeth of the flexible external gear is two greater than that of the rigid internal gear.

(c) The tooth profile of the flexible external gear is convex and the shape thereof is that of a curve obtained by subjecting a gear tooth portion, which, at the moving path that the external gear describes relative to the internal gear, as determined by rack approximation, is convex relative to the internal gear, to similarity transformation at a reduction ratio $\lambda$ using the limiting point of the contact between the two gears on the path as the origin.

(d) The tooth profile of the rigid internal gear is concave and the shape thereof is that of a curve obtained by subjecting the same portion convex relative to the internal gear at the moving path to similarity transformation at an enlargement ratio $(1+\lambda)$ using the limiting point as the origin, whereby the meshing of the two gears maintains continuous contact and is of the passing type.

On the other hand, this invention is characterized in that the following configuration is adopted in a flexible meshing type gear device equipped with a cup-shaped flexible external gear.

(a) The rigid internal gear and the cup-shaped flexible external gear are both spur gears.

(b) The number of teeth of the cup-shaped flexible external gear is two greater than that of the rigid internal gear.

(c) The tooth profile of the cup-shaped flexible external gear is convex and the shape thereof is that of a curve obtained by subjecting a gear tooth portion which, at the moving path that the external gear describes relative to the internal gear in a basic section of the tooth trace, as determined by rack approximation, is convex relative to the internal gear to similarity transformation at a reduction ratio $\lambda$ using the limiting point of the contact between the two gears on the path as the origin.

(d) The tooth profile of the rigid internal gear is concave and the shape thereof is that of a curve obtained by subjecting the same portion convex relative to the internal gear at the moving path to similarity transformation at an enlargement ratio $(1+\lambda)$ using the limiting point as the origin, whereby the meshing of the two gears maintains continuous contact and is of the passing type.

(e) Relieving is applied to teeth of the cup-shaped flexible external gear toward the opening side from the basic section of the tooth trace.

In order to further expand the meshing region of the two gears, it is preferable, in addition to the above feature (e), to apply reverse relieving to teeth of the cup-shaped flexible external gear toward the diaphragm side from the basic section of the tooth trace.

BEST MODE FOR CARRYING OUT THE INVENTION

Embodiments of the invention will be explained with reference to the drawings in the following.

Figure 1:
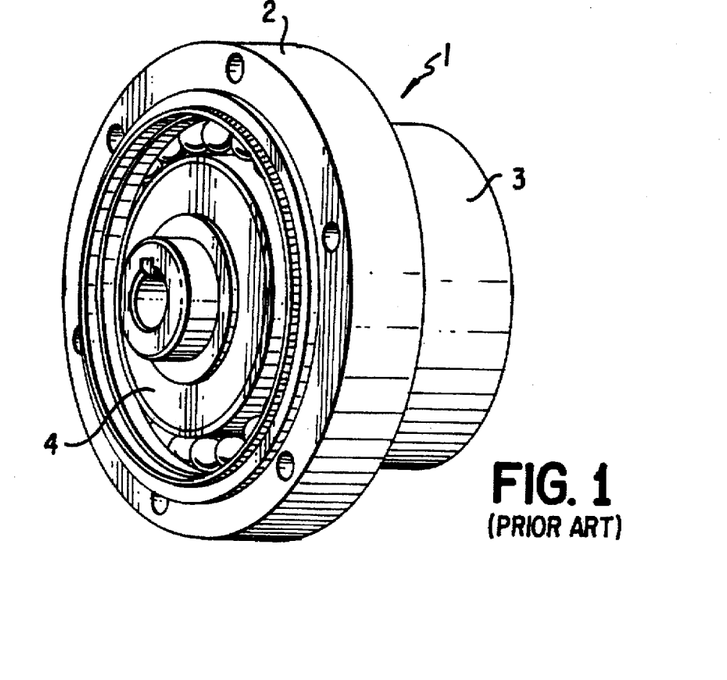
FIG. 1 is a perspective view of a flexible meshing type gear device equipped with a cup-shaped flexible external gear.
Figure 2:
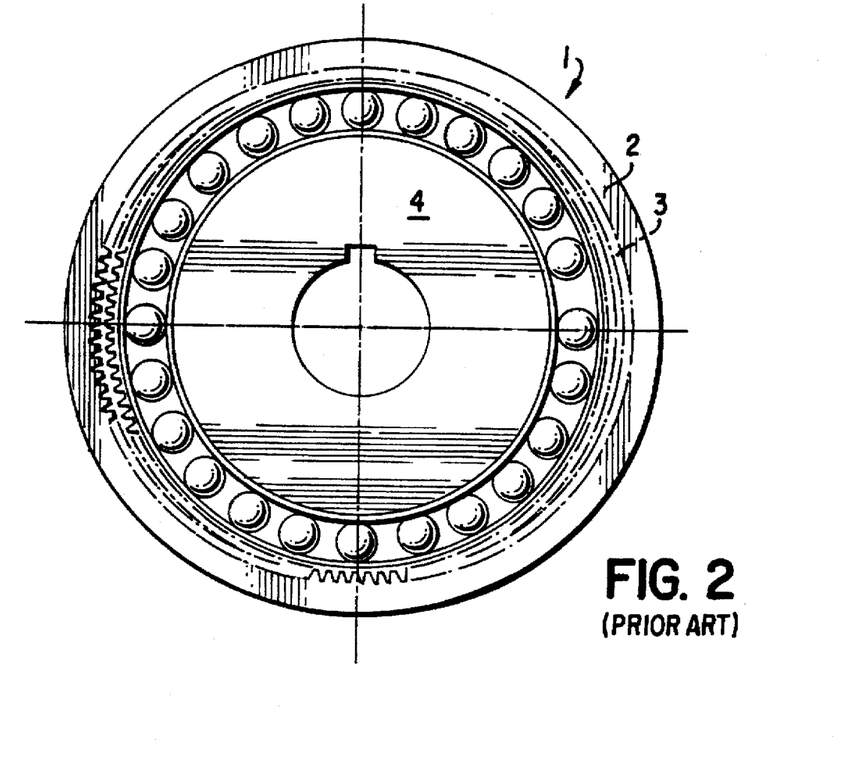
FIG. 2 is a schematic front view of the device of FIG. 1.

FIGS. 1 and 2 are perspective and front views of a prior-art flexible meshing type gear device to which this invention can be applied. This flexible meshing type gear device 1 comprises a cylindrical rigid internal gear 2, a cup-shaped flexible external gear 3 disposed inside the rigid internal gear 2, and a elliptical wave generator 4 fitted inside the cup-shaped flexible external gear 3. The cup-shaped flexible external gear 3 is in a flexed state produced by the wave generator 4.

Figure 3A:
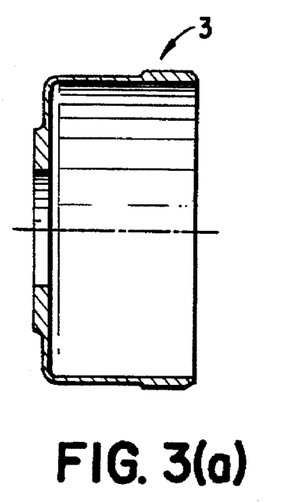
FIG. 3 is a set of diagrams for explaining how the cup-shaped flexible external gear is flexed by coning, in which (a) is section through the axis before deformation, (b) is a section through the axis including the major axis of the wave generator, and (c) is a section through the axis including the minor axis.
Figure 3B:
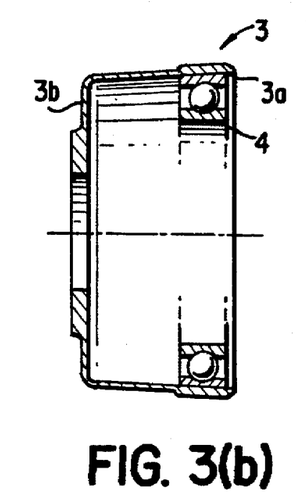
Figure 3C:
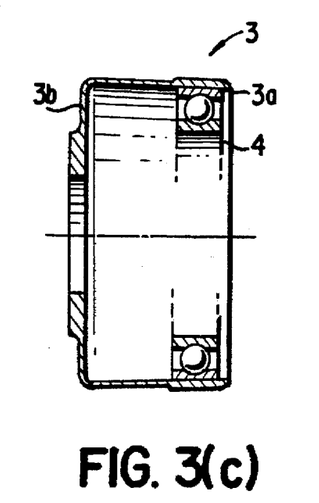

FIG. 3 shows the flexed state in sections through the axis of the cup-shaped flexible external gear 3 caused so-called coning, namely, by flexing the opening portion of the flexible external gear. FIG. 3(a) shows the state before deformation, (b) is a section through the axis including the major axis of the wave generator 4, and (c) is a section through the axis including the minor axis thereof. As can be seen from these diagrams, the amount of flexing produced in the cup-shaped flexible external gear 3 is maximum at the opening portion 3a and gradually decreases toward the side of a diaphragm 3b.

The point in which this invention differs fundamentally from prior-art flexible meshing type gear devices is that the number of teeth of the flexible external gear is two greater than that of the rigid internal gear. Since the difference in number of teeth is reversed from in prior-art devices in this way, the moving path of the flexible external gear to which this invention is applied becomes as shown in FIG. 4.

Figure 4:
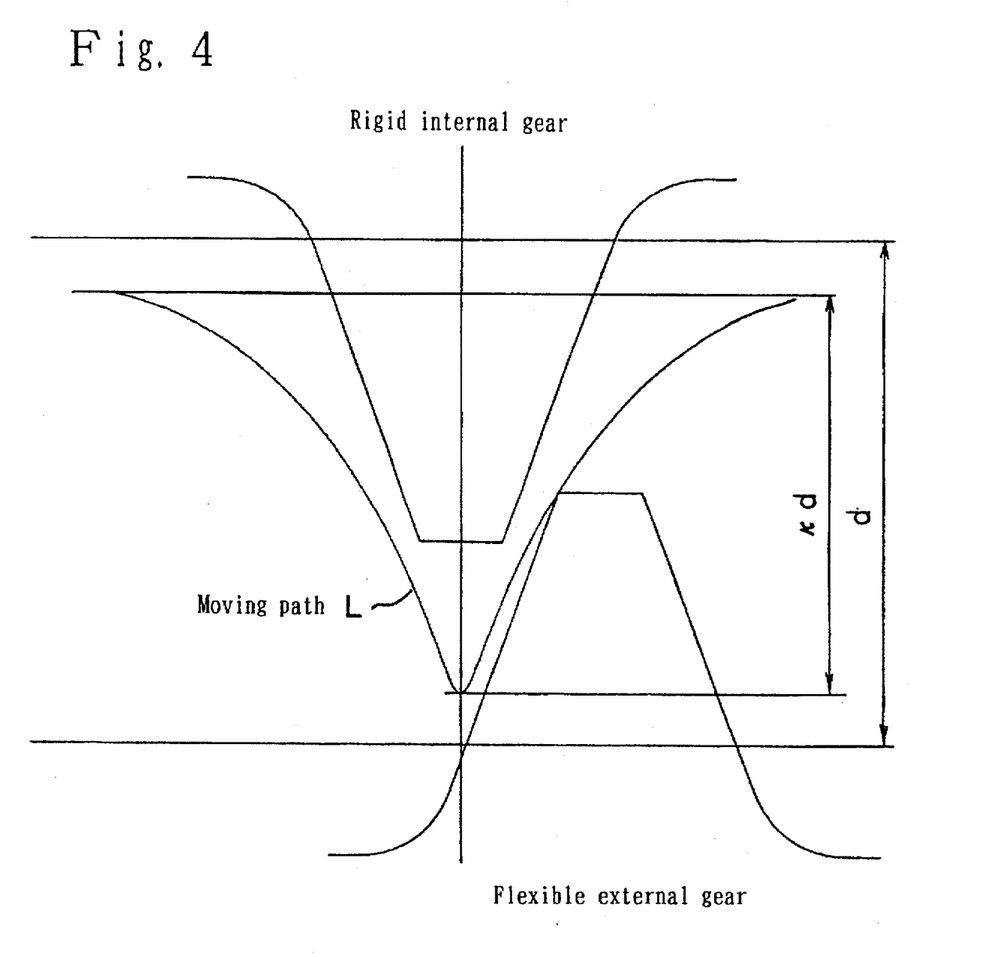
FIG. 4 is the moving path in a basic section perpendicular to the axis in the case of negative deviation of a tooth of the cup-shaped flexible external gear relative to the rigid internal gear in a flexible meshing type gear device.

More specifically, FIG. 4 shows the moving path L of a tooth of the cup-shaped flexible external gear with respect to the rigid internal gear in a basic section perpendicular to the tooth of the flexible external gear (a section perpendicular to the axis for considering the moving path used to derive the tooth profile; normally taken as the section at the center of the tooth trace) in the case where the amount of flexing (difference between the major and minor axes of the ellipse produced by deformation of the pitch circle of the flexible external gear) is $\kappa$ ($\kappa<1$) times the normal value d, i.e., $\kappa d$. This is the so-called negative deflection state. The phase is inverted vertically from that of the moving path of the external gear in prior-art devices of this type.

Since a flexible meshing type gear device has many teeth, the meshing can be approximated as a rack. In this and the other drawings, therefore, it is treated by rack approximation.

Figure 5:
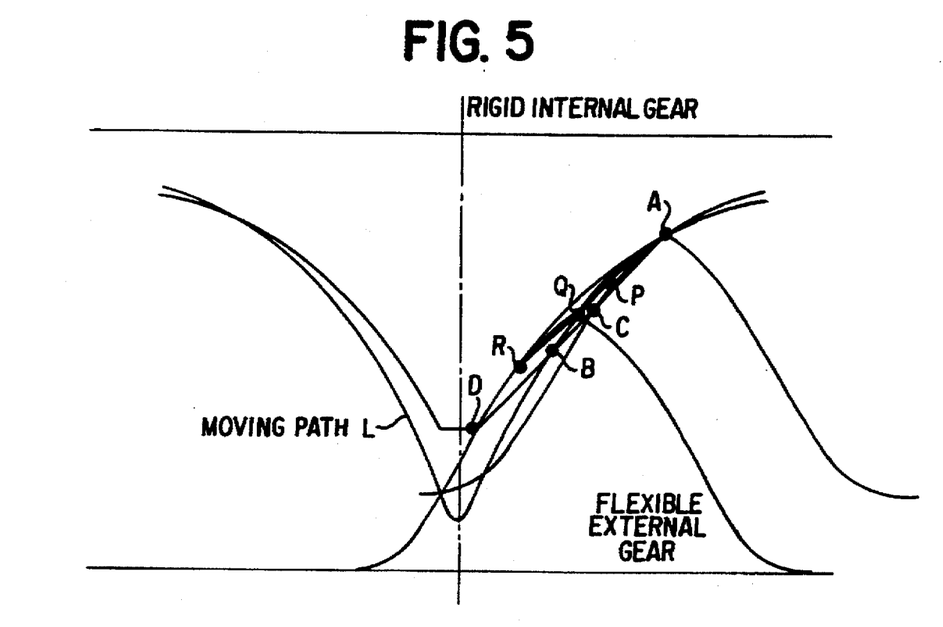
FIG. 5 is a diagram for explaining the method of tooth profile derivation of this invention.

FIG. 5 is a diagram for explaining the method of tooth profile derivation of this invention. Point A is the upper (deeper in the tooth space of the rigid internal gear) limiting point of meshing on the moving path L. Point B is the lower limiting point of the curved portion of the path which is convex with respect to the rigid internal gear. Curve AC is obtained by similarity transformation (a proportional size change) of the original curve of the moving path between A and B at a reduction ratio $\lambda$ using point A as the origin (center of similarity) and this curve AC is adopted as the tooth profile of the flexible external gear. This tooth profile is therefore convex.

Next, curve AD is obtained by similarity transformation of curve AB at an enlargement ratio $(1+\lambda)$ using point A as the origin and this curve AD is adopted as the tooth profile of the rigid internal gear. This tooth profile is therefore concave. Here, point B is defined beforehand within the range in which intersection with the tooth profile on the opposite side does not occur.

Since the foregoing alone results in a flexible external gear tooth that comes to a point at the tip, in actual practice the tooth is somewhat lowered and has a tooth crest at the top, as shown in the drawing.

That the two gears properly mesh can be demonstrated as follows.

Define an arbitrary point on the tooth profile AD of the rigid internal gear as R and draw straight line AR. Let the points of intersection of straight line AR with the tooth profile AC of the flexible external gear and the moving path AB be P and Q. In view of the manner in which the tooth profile was determined, it then holds that $AP=\lambda \cdot AQ$ $AR=(1+\lambda) \cdot AQ$.

Therefore, $$QR=AR-AQ=\lambda \cdot AQ=\lambda P.$$

From the nature of similarity, moreover, the tangents to the curves at the three points P, Q and R are mutually parallel.

From these two facts, it can be seen that when point A of the convex tooth profile AC is at point Q, the convex tooth profile AC contacts the concave tooth profile AD at point R. In other words, continuous meshing of the convex tooth profile AC and the concave tooth profile AD is ensured. In addition, the meshing begins from the position where point C makes contact with point D (state when point Q is at B) and ends with meshing at point A (state when point Q is at A). It is therefore so-called pass meshing.

Figure 6:
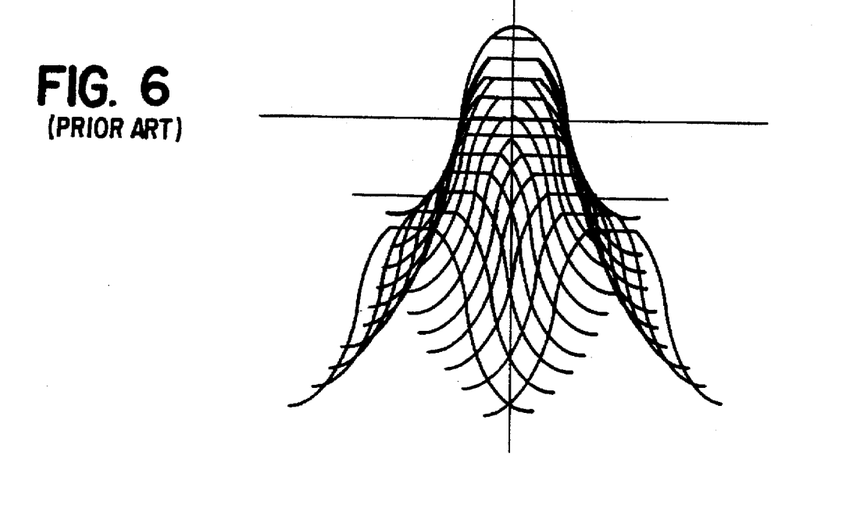
FIG. 6 is a diagram for explaining the meshing of conventional countermovement type tooth profiles.

By way of reference, FIG. 6 shows a contrasting example of countermovement meshing in an earlier invention of the inventor. It is well known that pass meshing is superior from the viewpoint of retention of lubricating oil.

Figure 7:
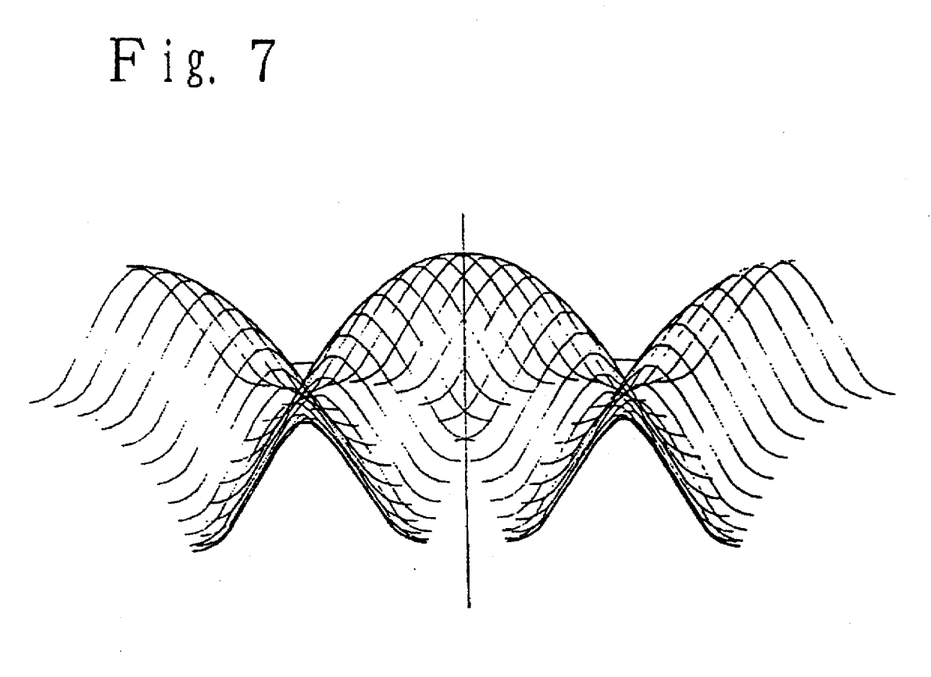
FIG. 7 is an explanatory diagram of the meshing of the tooth profiles of this invention in a basic section perpendicular to the tooth, drawn relatively with respect to one tooth space of the rigid internal gear followed over the passage of time.
Figure 8:
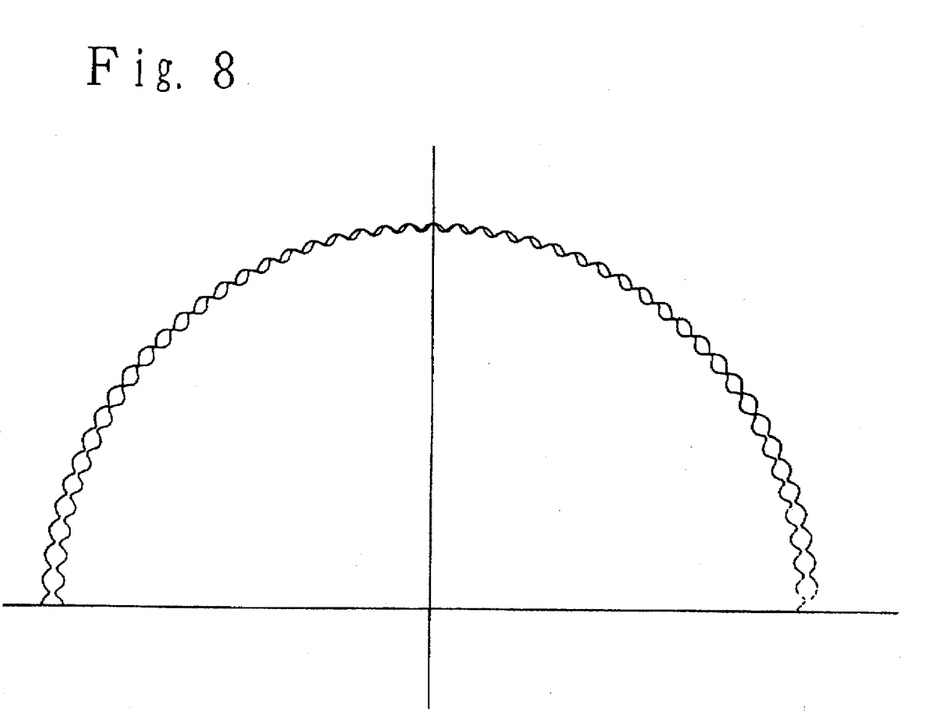
FIG. 8 is an explanatory diagram of the meshing of the tooth profiles of this invention in a basic section perpendicular to the tooth, drawn spatially over half the teeth of the rigid internal gear.

FIG. 7 shows the meshing of the tooth profiles of this invention drawn relatively with respect to one tooth space of the rigid internal gear followed over the passage of time. FIG. 8 shows the meshing drawn spatially over half the teeth. From FIG. 8 it can further be seen that the meshing region excludes the vicinity of the major axis. This, taken in light of the fact that the bending stress accompanying the elliptical deformation is greatest at the major axis, indicates that the present tooth profile is also superior in the aspect of maintaining rim strength.

Figure 9A:
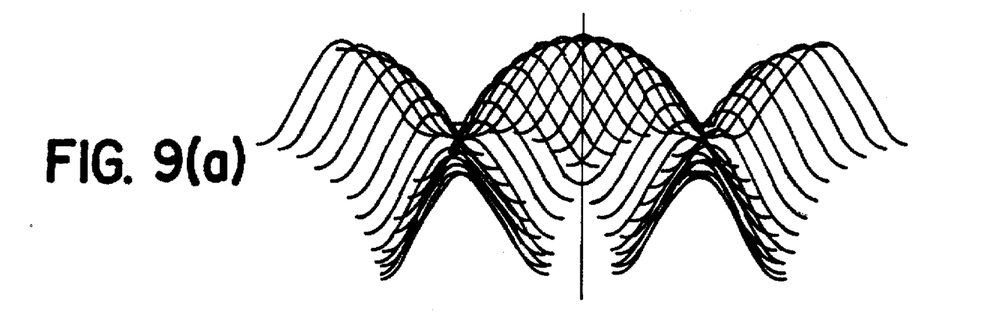
FIG. 9 is a set of diagrams for explaining meshing of the tooth profiles of this invention in basic sections other than that perpendicular to the tooth, in which (a) is for a section on the opening side of the basic section perpendicular to the tooth, (b) shows the case of applying relieving thereto, (c) is for a section on the diaphragm side of the basic section perpendicular to the tooth, and (d) shows the case of applying reverse relieving thereto.
Figure 9B:
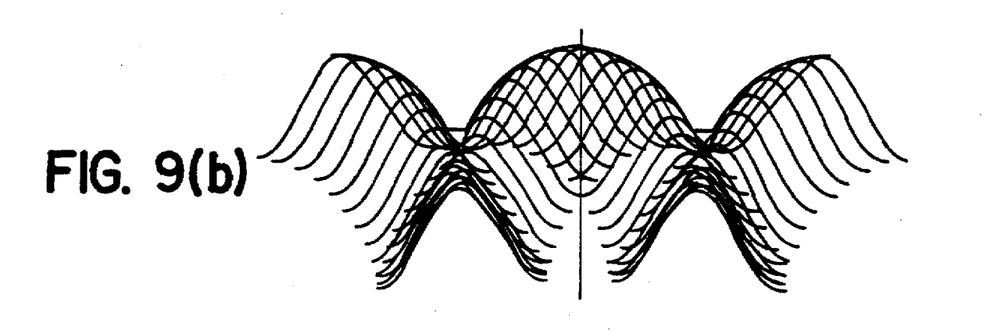
Figure 9C:
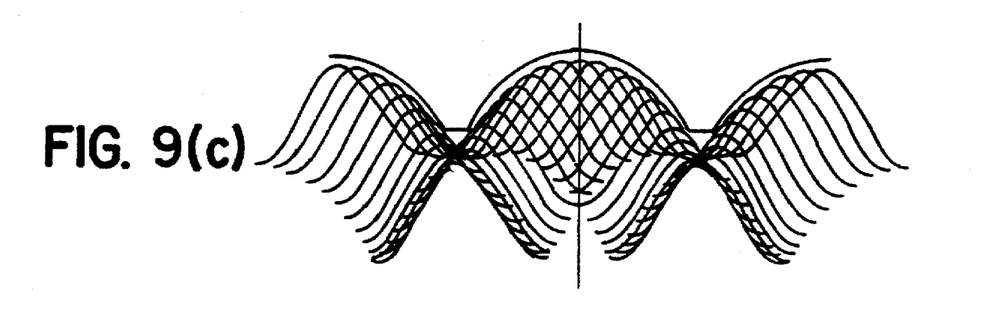

Next, the properties of a flexible external gear with respect to coning will be considered. The tooth profile of this invention is derived from the moving path of the basic section and does not apply to other sections without modification. This is shown in FIG. 9. FIG. 9(a) shows the meshing at a section on the opening side of the basic section and (c) shows the meshing at a section on the diaphragm side of the basic section.

Figure 10A:
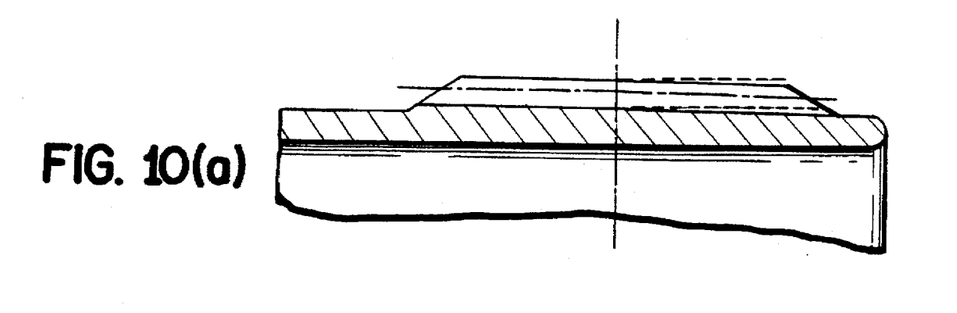
FIG. 10 is a set of diagrams for explaining correction applied to the teeth of the cup-shaped flexible external gear, in which (a) is a diagram showing relieving applied on the opening side of a basic section perpendicular to the tooth and (b) is a diagram showing reverse relieving further applied on the diaphragm side of the basic section perpendicular to the tooth.

From these figures it can be seen that in a section on the diaphragm side of the basic section, there is no danger interference owing to the occurrence of a gap between the two tooth profiles. In contrast, it can be seen that interference occurs between the teeth in a section on the opening side of the basic section. As shown in FIG. 10(a), therefore, this invention concurrently uses a method which avoids interference and brings the meshing closer to normal by applying relieving matched to the amount of tooth interference on the opening side of the basic section. FIG. 9(b) shows the meshing at the section on the opening side when this relieving is applied.

Figure 9D:
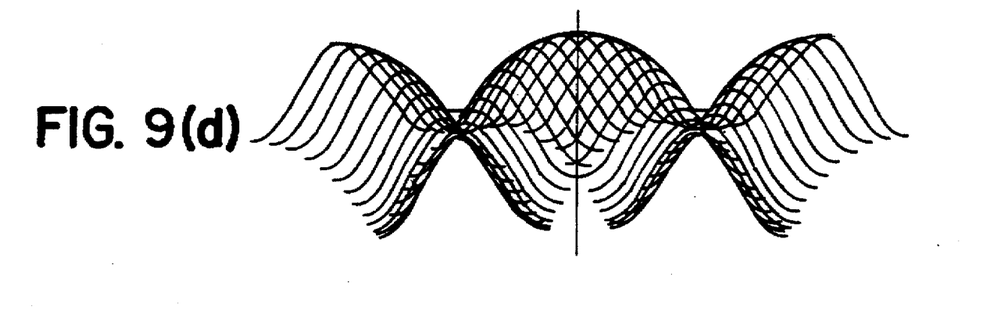
Figure 10B:
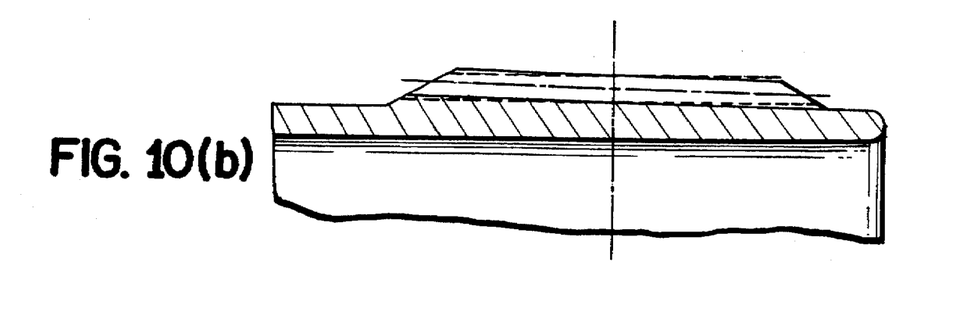

While the situation is acceptable without modification in a section on the diaphragm side of the basic section, it is also possible, as shown in FIG. 10(b), to positively expand the meshing region by further applying reverse relieving matched to the amount of tooth clearance on diaphragm side of the basic section. FIG. 9(d) shows the meshing of the section in this case.

An example of the application of this invention to the tooth profiles of a flexible meshing type gear device fitted with a cup-shaped flexible external gear was explained in the foregoing. This invention can, however, also be applied to the tooth profiles of a flexible meshing type gear device fitted with a flexible external gear of so-called flat-type annular shape and not requiring any consideration regarding coning. Since in this case there is no need to consider interference or the like of the two gears because of coning, relieving of the type described above is unnecessary.

Industrial Applicability

By the present invention, it is possible to greatly enhance the ability to retain a lubricating oil film between the tooth surfaces and to markedly improve the permissible transmitted torque of the flexible meshing type gear device based on tooth surface wear. By eliminating the vicinity of the major axis of the flexible external gear from the meshing range, moreover, an improvement in the rim strength of the flexible external gear can be achieved.

In addition, when this invention is applied to a device equipped with a cup-shaped flexible external gear, it can be applied independently of the coning angle of the flexible external gear. As a result, the invention has the merit of being applicable without modification to types having cup-shaped flexible external gears of short body length.

We claim:

1. A flexible meshing type gear device with a pass meshing tooth profile having a rigid internal gear, a flexible external gear inside the internal gear and a wave generator for flexing the external gear into an elliptical cross-sectional shape, causing the external gear to mesh partially with the rigid internal gear and rotating the mesh position of the two gears in the circumferential direction, rotation of the wave generator producing relative rotation between the two gears, the flexible meshing type gear device with a pass meshing tooth profile being characterized in that (a) the rigid internal gear and the flexible external gear are both spur gears, (b) the number of teeth of the flexible external gear is two greater than that of the rigid internal gear, (c) the tooth profile of the flexible external gear is convex and the shape thereof is that of a curve obtained by subjecting a moving part portion which, at a moving path that the external gear describes relative to the internal gear, as determined by rack approximation, is convex relative to the internal gear, to similarity transformation at a reduction ratio $\lambda$ using a limiting point of the contact between the two gears on the path as an origin, and (d) the tooth profile of the rigid internal gear is concave and the shape thereof is that of a curve obtained by subjecting the same portion convex relative to the internal gear at the moving path to similarity transformation at an enlargement ratio $(1+\lambda)$ using the limiting point as the origin, whereby the meshing of the two gears maintains continuous contact and is of the passing type.

2. Flexible meshing type gear device with a pass meshing tooth profile having a rigid internal gear, a cup-shaped flexible external gear inside the internal gear, and a wave generator for flexing the external gear such that an amount of deflection produced in a deflected portion of the external gear increases from a diaphragm side thereof toward an opening portion thereof approximately in proportion to a distance from the deflected portion to the diaphragm, causing the external gear to mesh partially with the rigid internal gear and rotating the mesh position of the two gears in the circumferential direction, rotation of the wave generator producing relative rotation between the two gears, the flexible meshing type gear device with a pass meshing tooth profile being characterized in that (a) the rigid internal gear and the cup-shaped flexible external gear are both spur gears, (b) the number of teeth of the cup-shaped flexible external gear is two greater than that of the rigid internal gear, (c) the tooth profile of the cup-shaped flexible external gear is convex and the shape thereof is that of a curve obtained by subjecting a moving path portion which, at a moving path that the external gear describes relative to the internal gear in a basic section of the tooth trace, as determined by rack approximation, is convex relative to the internal gear, to similarity transformation at a reduction ratio $\lambda$ using a limiting point of the contact between the two gears on the path as an origin, (d) the tooth profile of the rigid internal gear is concave and the shape thereof is that of a curve obtained by subjecting the same portion convex relative to the internal gear at the moving path to similarity transformation at an enlargement ratio $(1+\lambda)$ using the limiting point as the origin, whereby the meshing of the two gears maintain continuous contact and is of the passing type, and (e) relieving is applied to teeth of the cup-shaped flexible external gear toward the opening side from the basic section of the tooth trace.

3. A flexible meshing type gear device with passing tooth profile according to claim 2, wherein reverse relieving is applied to teeth of the cup-shaped flexible external gear toward the diaphragm side from the basic section of the tooth trace.

* * * * *